(12) United States Patent
Chen et al.

(10) Patent No.: US 9,465,408 B2
(45) Date of Patent: Oct. 11, 2016

(54) DISPLAY APPARATUS, FABRICATING METHOD THEREOF AND OPTICAL ADHESIVE

(71) Applicants: Yin-Ta Chen, Taipei (TW);
Kuang-Cheng Fan, Taipei (TW);
Shih-Wei Li, Taipei (TW)

(72) Inventors: Yin-Ta Chen, Taipei (TW);
Kuang-Cheng Fan, Taipei (TW);
Shih-Wei Li, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 13/952,657

(22) Filed: Jul. 28, 2013

(65) Prior Publication Data
US 2014/0333846 A1 Nov. 13, 2014

(30) Foreign Application Priority Data

May 13, 2013 (TW) .............................. 102116926 A

(51) Int. Cl.
*G06F 3/041* (2006.01)
*G06F 1/16* (2006.01)
(Continued)

(52) U.S. Cl.
CPC ............ *G06F 1/1601* (2013.01); *C09J 175/04* (2013.01); *G02F 1/13338* (2013.01); *B32B 2457/20* (2013.01); *B32B 2457/208* (2013.01); *C09J 175/06* (2013.01); *C09J 175/08* (2013.01); *G02F 2202/28* (2013.01); *Y10T 156/11* (2015.01); *Y10T 428/1059* (2015.01); *Y10T 428/1077* (2015.01)

(58) Field of Classification Search
CPC ........... B26D 3/28; B32B 7/12; B32B 37/00; B32B 37/12; B32B 37/14; B32B 38/10; B32B 43/006; B32B 2457/208; B32B 2457/20; C09J 7/0239; C09J 175/06; C09J 175/04; C09J 175/08; G02B 5/20; H05K 7/00; C08F 2222/1086; C08F 290/067; C08G 71/04; G06F 1/1601; G02F 1/13338; G02F 2202/28; Y10T 156/11; Y10T 428/1059; Y10T 428/1077
USPC .......... 428/1.5, 1.55, 1.61; 349/122; 156/60, 156/99, 101, 102, 104, 107, 152, 182, 247, 156/175.1, 275.3, 304.2, 304.5, 308.4, 156/324.4, 326, 327, 331.7, 701, 714, 719
See application file for complete search history.

(56) References Cited

U.S. PATENT DOCUMENTS 8,080,609 B2 * 12/2011 Schmatloch ................. 524/588
2004/0167295 A1 * 8/2004 Kleineberg et al. .......... 525/437
(Continued)

FOREIGN PATENT DOCUMENTS

| CN | 102203194 | 9/2011 |
|---|---|---|
| TW | I336291 | 1/2011 |

(Continued)

OTHER PUBLICATIONS

"Office Action of Taiwan Counterpart Application", issued on Dec. 14, 2015, p. 1-p. 8.

*Primary Examiner* — Gwendolyn Blackwell
*Assistant Examiner* — Eli D Strah
(74) *Attorney, Agent, or Firm* — Jianq Chyun IP Office

(57) ABSTRACT

A display apparatus includes a first panel, a display panel disposed at one side of the first panel, a film with a hallow region disposed between the first panel and the display panel, and an optical adhesive disposed in the hollow region of the film and between the first panel and the display panel.

5 Claims, 5 Drawing Sheets

(51) Int. Cl.
  *G02F 1/1333* (2006.01)
  *C09J 175/04* (2006.01)
  *C09J 175/06* (2006.01)
  *C09J 175/08* (2006.01)

(56) References Cited

U.S. PATENT DOCUMENTS

2011/0126968 A1* 6/2011 Determan .............. C09J 7/0207
                                                                156/229

2013/0241862 A1* 9/2013 Kim et al. .................... 345/173
2014/0098327 A1* 4/2014 Chen ............................... 349/96

FOREIGN PATENT DOCUMENTS

| WO | WO 2012/070791 A2 * | 5/2012 | ................ C09J 7/02 |
| WO | 2012087804 | 6/2012 | |
| WO | WO 2012/087804 A1 * | 6/2012 | ........... G02F 1/1335 |

* cited by examiner

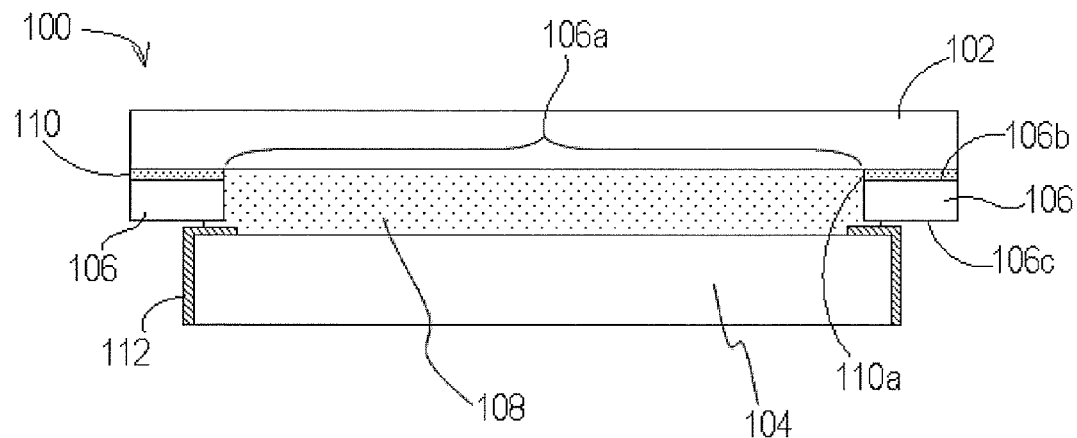
FIG.1
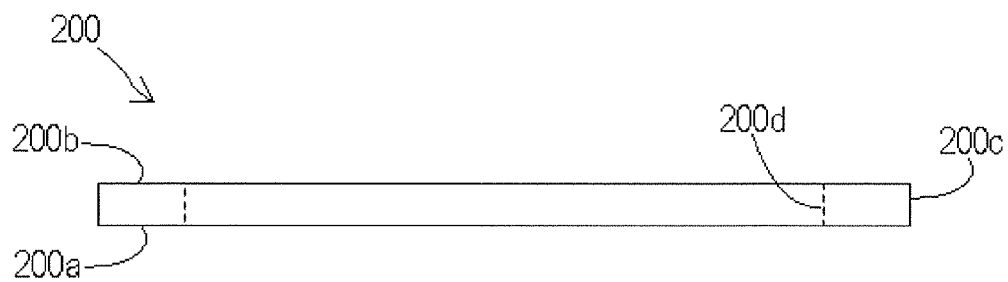
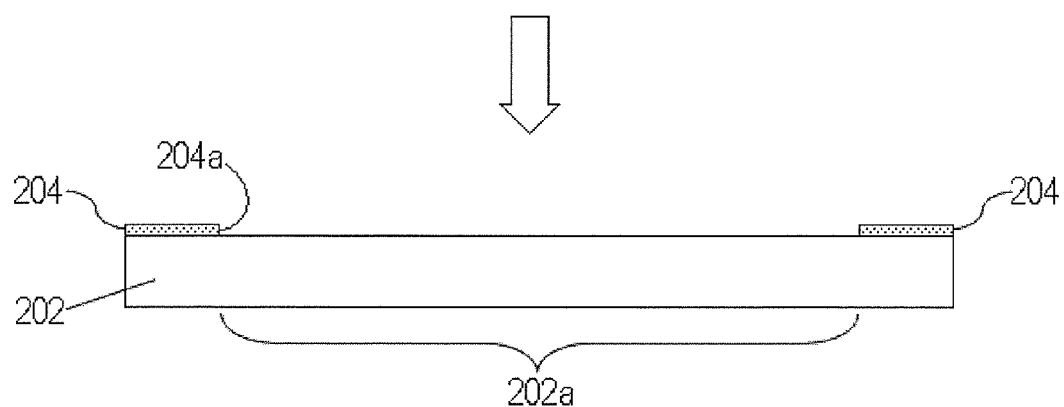
FIG.2A-1

DISPLAY APPARATUS, FABRICATING METHOD THEREOF AND OPTICAL ADHESIVE

CROSS-REFERENCE TO RELATED APPLICATION

This application claims the priority benefit of Taiwan application serial no. 102116926, filed on May 13, 2013. The entirety of the above-mentioned patent application is hereby incorporated by reference herein and made a part of this specification.

BACKGROUND OF THE INVENTION

1. Field of the Invention

The invention relates to a display apparatus, and more particularly, to a display apparatus of a touch panel.

2. Description of Related Art

Generally, a touch display apparatus mainly includes a display panel and a touch panel. Regarding optical screen lamination, one known touch display apparatus uses an optical adhesive to adhere the display panel and the touch panel together, wherein the optical adhesive is evenly coated between the display panel and the touch panel, does not generate interface reflection, and has good display effects. However, during the fabricating process, the optical adhesive may generate bubbles and cause anomalous scattering of light. Moreover, the approach of using the optical adhesive still has the problems of the overall thickness being too thick and difficulty in rework when poorly laminated.

Currently, there are two methods of rework for optical lamination. One is to use a steel wire or a nylon thread to cut through the middle of the optical adhesive on the finished product after the lamination and solidifying are completed. After separation, a special solvent is used to wipe and remove the adhesive residue. The other method is to directly separate the defective product in the semifinished product after lamination but before solidifying, and then using a special solvent to wipe and remove the adhesive residue. This shows that the rework methods are complex, time-consuming, and a waste of human resource. Moreover, the possibility of failure is very high, and therefore the rework methods are unable to meet the requirement of the production line today.

Since the probability of defective products is very high in the production line, or the mold often needs to be changed in response to the change in dimension, the industry needs a simple and inexpensive rework method to disassemble and separate the optical adhesive without the need to use a toxic solvent for removing adhesive residue.

SUMMARY OF THE INVENTION

The invention provides a display apparatus. The display apparatus can complete rework without the use of a special solvent, and thus can save costs and simplify the fabricating process.

The invention further provides a fabricating method of a display apparatus. The fabricating method can fabricate the above display apparatus.

The invention also provides an optical adhesive. The optical adhesive can be applied to the display apparatus.

The invention provides a display apparatus, including a first panel, a display panel disposed at one side of the first panel, a film with a hollow region disposed between the first panel and the display panel, and an optical adhesive disposed in the hollow region of the film and between the first panel and the display panel.

In an embodiment of the invention, the first panel is a touch panel or a glass panel.

In an embodiment of the invention, the hollow region is formed by cutting a film along an inner edge of a print region surrounding the first panel.

In an embodiment of the invention, a surface of the film contacted to the first panel is a first surface with low surface tension.

In an embodiment of the invention, a surface of the film contacted to the display panel is a second surface with high surface tension.

In an embodiment of the invention, the optical adhesive can extend between the second surface of the film and the display panel.

In an embodiment of the invention, the film has at least one protruding portion protruding from an edge of the first panel.

The invention also provides a fabricating method of a display apparatus. The fabricating method includes disposing a film with a hollow region on a first panel, applying an optical adhesive on the display panel, and laminating the first panel and the display panel with the optical adhesive such that the optical adhesive extends toward an edge from an inner of the hollow region of the film. The optical adhesive is then solidified.

In another embodiment of the invention, before disposing the film on the first panel, a treatment can be performed on a first surface of the film adjacent to the first panel such that the first surface has low surface tension so as to adhere to the first panel through electrostatic adsorption.

In another embodiment of the invention, before disposing the film on the first panel, a treatment can be performed on a second surface of the film adjacent to the display panel such that the second surface has high surface tension.

In another embodiment of the invention, before disposing the film on the first panel, the film can be cut first such that the size of the edge thereof is the same as the size of the first panel. Next, the hollow region is formed by correspondingly cutting the film along the inner edge of the print region surrounding the first panel.

In another embodiment of the invention, when cutting the film, at least one protruding portion is disposed on the edge of the film corresponding to the first panel.

The invention also provides an optical adhesive. The optical adhesive can be applied to the display apparatus and the fabricating method thereof. The optical adhesive includes 97 wt % or more of an aliphatic polyurethane-based polymer, wherein the main chain thereof includes 50 wt % to 97 wt % of a urethane polymer, 2 wt % to 30 wt % of a lauric acid-based polyester, and 1 wt % to 20 wt % of an ethoxy-based polyester.

In each embodiment of the invention, the difference between the polarity of the lauric acid-based polyester and the polarity of the ethoxy-based polyester is at least 1.

In each embodiment of the invention, the molecular weight of the lauric acid-based polyester is greater than 200.

In each embodiment of the invention, the molecular weight of the ethoxy-based polyester is less than 200.

In each embodiment of the invention, the glass transition temperature of the aliphatic polyurethane-based polymer is less than 0° C.

Based on the above, the film is disposed between the touch panel and the display panel, and the optical adhesive is disposed in the hollow region of the film. During the disassembly rework, the optical adhesive having strong cohesion can be completely removed without the use of a special solvent for cleaning by dragging the film, which can save costs and simplify the fabricating process. Moreover, the surfaces of the two sides of the film can respectively have high and low surface tension through surface treatment, wherein the surface having low surface tension facilitates the electrostatic adhesion between the film and the touch panel and the surface having high surface tension can closely laminate the film and the optical adhesive.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a cross-sectional schematic diagram of a display apparatus according to the first embodiment of the invention.

FIG. 2A-1 to FIG. 2A-4 are schematic flow diagrams of the steps of disposing a film with a hollow region on a first panel according to a fabricating method of a display apparatus of the second embodiment of the invention.

FIG. 3 is a cross-sectional schematic diagram of the display apparatus of FIG. 2C in rework.

DESCRIPTION OF THE EMBODIMENTS

Figures 2, 2A:
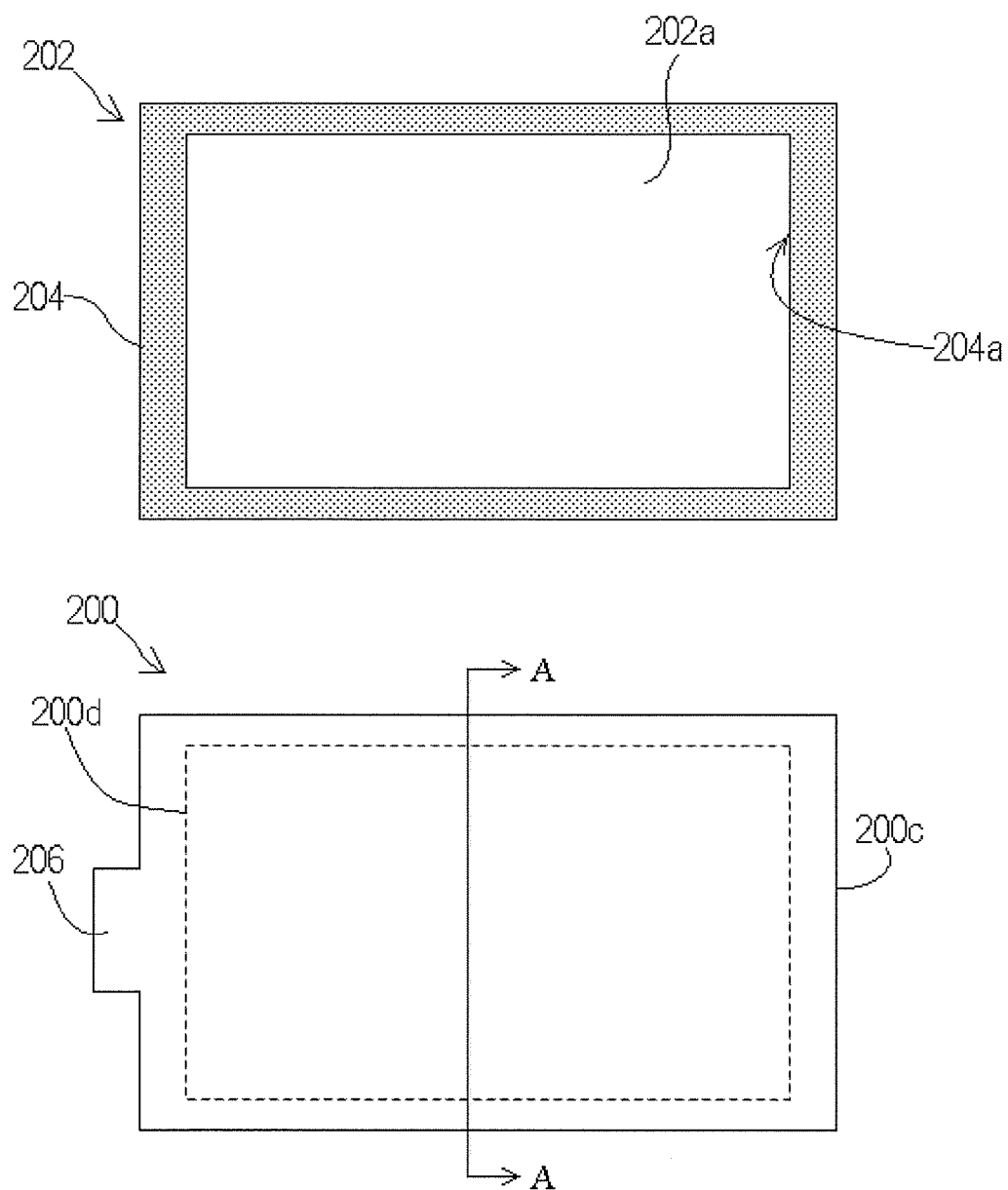

FIG. 1 is a cross-sectional schematic diagram of a display apparatus according to the first embodiment of the invention. Referring to FIG. 1, a display apparatus 100 of the first embodiment includes a first panel 102, a display panel 104 at one side of the first panel 102, a film 106 disposed between the first panel 102 and the display panel 104, and an optical adhesive 108. The film 106 has a hollow region 106a, and the film 106 is, for instance, a transparent film made of a PET or a PC material, but the invention is not limited thereto. The surrounding area of the first panel 102 has, for instance, a print region 110, and ink is printed in the region 110. Therefore, the hollow region 106a of the film 106 can be formed by cutting a film (not illustrated) along an inner edge 110a of the print region 110 surrounding the first panel 102. Moreover, the surface of the film 106 contacted to the first panel 102 can be a first surface 106b with low surface tension to facilitate the electrostatic adsorption between the film 106 and the first panel 102. The surface of the film 106 contacted to the display panel 104 can be a second surface 106c with high surface tension such that the film 106 and the optical adhesive 108 can be closely laminated. As a result, the optical adhesive 108 is removed together with the film 106 when rework is needed later. In the invention, the first panel 102 can be a touch panel or a glass panel, and a structural element 112 (such as an iron frame) can be arranged in the surrounding area of the display panel 104 for fabricating an apparatus such as a backlight module.

In the first embodiment, the optical adhesive 108 is disposed in the hollow region 106a of the film 106 and between the first panel 102 and the display panel 104. The optical adhesive 108 includes 97 wt % or more of an aliphatic polyurethane-based polymer, and the glass transition temperature of the aliphatic polyurethane-based polymer is, for instance, less than 0° C. The main chain of the aliphatic polyurethane-based polymer includes, for example, 50 wt % to 97 wt % of a urethane polymer, 2 wt % to 30 wt % of a lauric acid-based polyester, and 1 wt % to 20 wt % of an ethoxy-based polyester. The difference between the polarity of the lauric acid-based polyester and the polarity of the ethoxy-based polyester is, for instance, at least 1, wherein the smaller the polarity of the ethoxy-based polyester the better, such that the optical adhesive achieves a linear molecular structure having a certain flexibility. On the other hand, the greater the polarity of the lauric acid-based polyester the better, such that the optical adhesive has tough cohesion so that when rework separation is performed on the optical adhesive, the optical adhesive does not readily break. However, the molecular weight of the lauric acid-based polyester is, for instance, greater than 200, and the molecular weight of the ethoxy-based polyester is, for instance, less than 200, wherein when the molecular weight of the lauric acid-based polyester is greater than 200, the main goal is to obtain a molecular structure having more straight chain repeating units when the polyester reacts in crosslinking polymerization and to make it easier to form a linear structure. When the molecular weight of the ethoxy-based polyester is less than 200, the main goal is that a portion of the groups can form three-dimensional structures of short-chains when the polyester reacts in a crosslinking polymerization and increase the cohesion of the optical adhesive through the forces in the molecules. The urethane polymer is a collective team for a class of organic compounds having the —NH(CO)O— functional group, which are esters of carbamic acid ($NH_2COOH$). The above lauric acid-based polyester is a saturated fatty acid. The saturated fatty acid is mainly used in the manufacture of emulsifiers, surfactants, and plasticizers. Food additives; the ethoxy-based polyester: ethoxylate is a nonionic surfactant and mainly includes three major categories: alkyl ether ethoxylate, cyclic ether ethoxylate, and amine ethoxylate . . . etc.

Figures 2, 2A, 3:
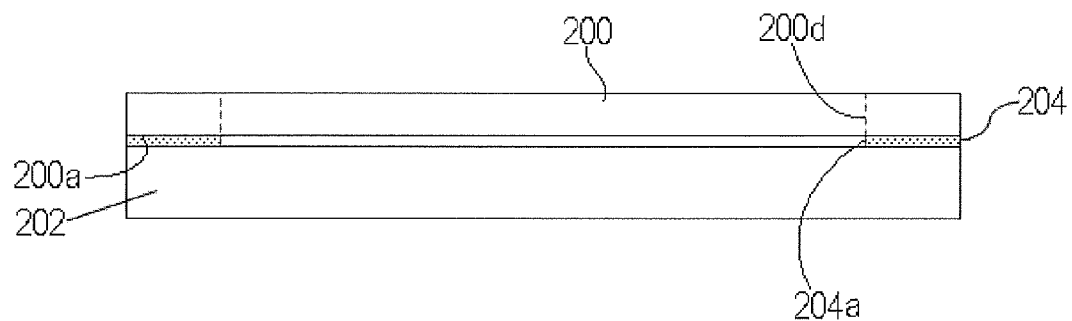
Figures 2, 2A, 3, 4:
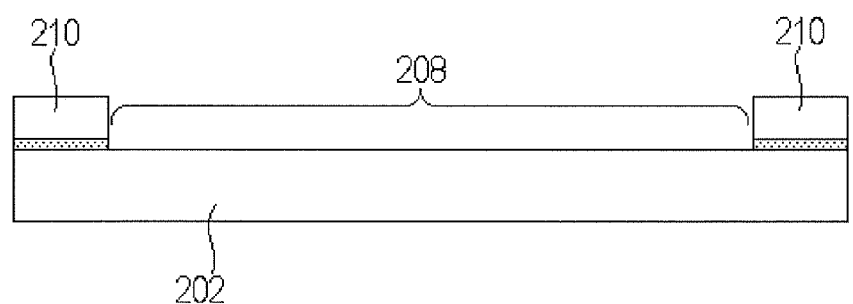
Figure 2B:
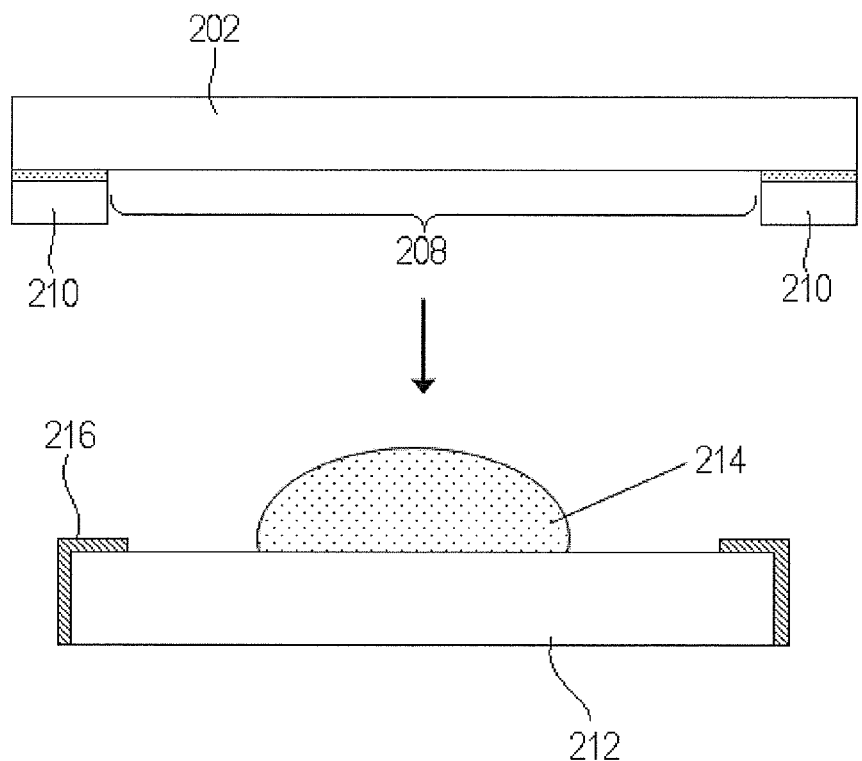
FIG. 2B is a cross-sectional diagram of the steps of applying an optical adhesive on a display panel and laminating a first panel and a display panel according to a fabricating method of a display apparatus of the second embodiment of the invention.
Figure 2C:
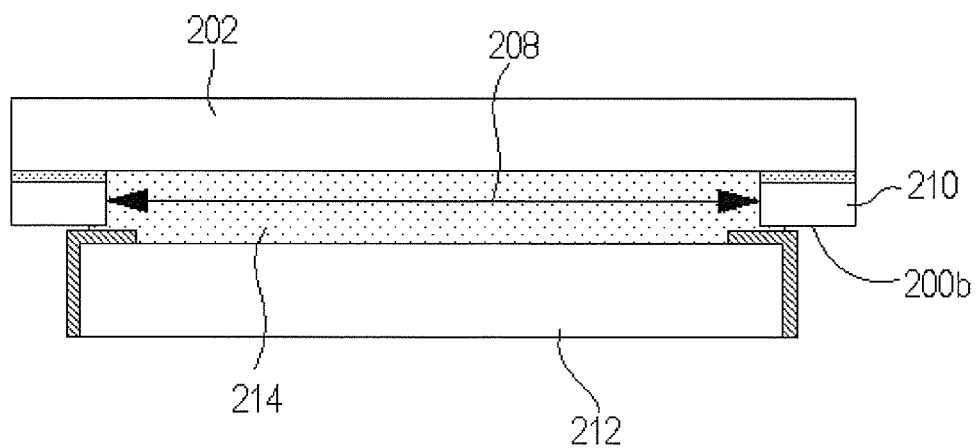
FIG. 2C is a cross-sectional schematic diagram of a display apparatus completed according to a fabricating method of the second embodiment of the invention.
Figure 3:
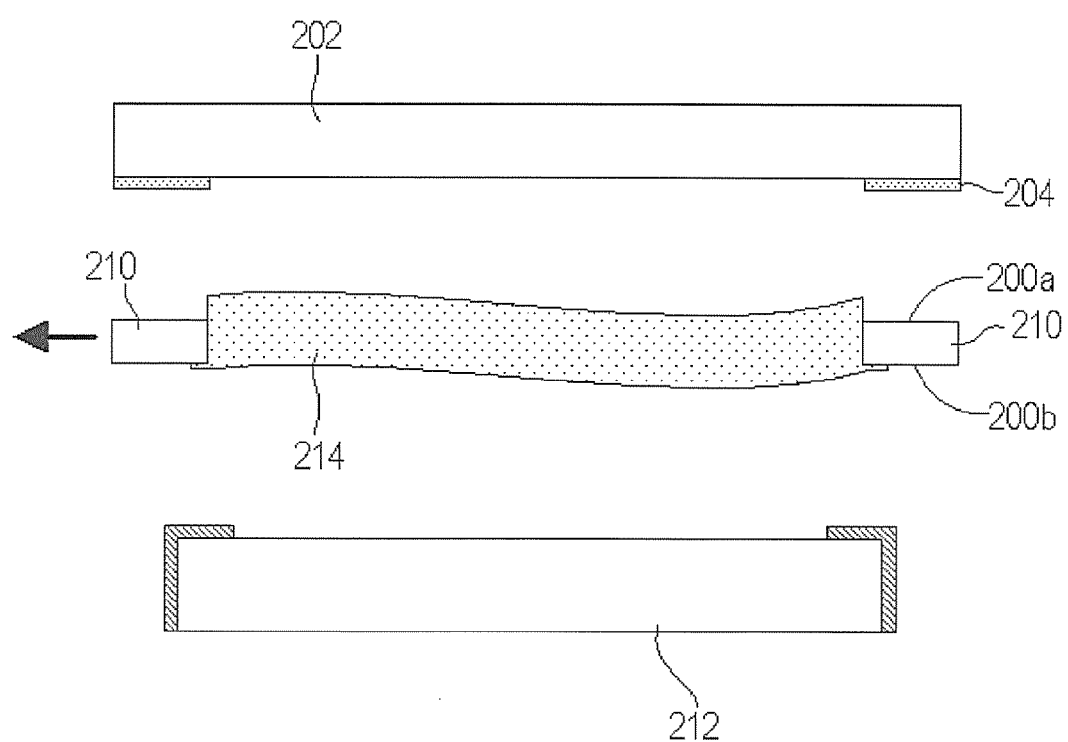

FIG. 2A-1 to FIG. 2C are schematic flow diagrams of the fabrication of a display apparatus illustrated according to the second embodiment of the invention.

First, a film is disposed on a panel. The step is as shown in FIG. 2A-1 to FIG. 2A-4, but is not limited thereto. Referring to FIG. 2A-1, a film 200 is prepared, wherein the film 200 has a first surface 200a and a second surface 200b. Before the fabricating process, a treatment can first be performed on the first surface 200a to make it having low surface tension, and another treatment can be performed on the second surface 200b to make it having high surface tension. The above treatments can be a chemical or a physical treatment. The chemical treatment is, for instance, using a primer to improve surface energy to increase surface bonding capability. The physical treatment is, for instance, an ionic charge treatment to increase electrostatic adhesion. Then, the first surface 200a of the film 200 and a first panel 202 are brought close together such that the first surface 200a having low surface tension is laminated to the first panel 202 through electrostatic adsorption.

The plane diagram of the film 200 and the first panel 202 is as shown in FIG. 2A-2, wherein FIG. 2A-1 is a cross-section of the A-A line of FIG. 2A-2. In the second embodiment, the film 200 can first be cut before performing above treatments to the film 200 such that the size of an edge 200c thereof is the same as the size of the first panel 202. Moreover, a protruding portion 206 can be disposed on the edge corresponding to the first panel 202 when cutting the film 200 as a dragging end, so that the protruding portion 206 can be directly dragged when performing rework later, wherein the protruding portion 206 is a portion of the film 200 and the number and position can be changed according to demand, and is not limited to the figures.

Moreover, since the first panel 202 is a touch panel or a glass panel, a print region 204 is usually present in the surrounding area thereof, as shown in FIG. 2A-1 and FIG. 2A-2. For the convenience of forming the film in later processes, a tool mark 200d (shown as a dash line in the figure) can be formed by correspondingly cutting the film 200 along an inner edge 204a (the visible region 202a of the first panel 202) of the print region 204 of the first panel 202.

Then, referring to FIG. 2A-3, when the first surface 200a of the film 200 and the first panel 202 are laminated, the inner edge 204a of the print region 204 will first correspond to the precut tool mark 200d. However, the relationship in position of the two can still be changed according to demand, and is not limited to as shown in the figure.

Next, referring to FIG. 2A-4, a portion of the film 200 is detached along the tool mark 200d to form a film 210 with a hollow region 208.

Then, referring to FIG. 2B, an optical adhesive 214 is applied on a display panel 212, wherein the step thereof is, for instance, first reversing the first panel 202 and coating the liquid optical adhesive 214 on the display panel 212, and then joining the hollow region 208 of the first panel 202 by aligning with the display panel 212. A structural element 216 (such as an iron frame) can be arranged in the surrounding area of the display panel 212 for fabricating an apparatus such as a backlight module. The optical adhesive 214 of the present embodiment is as described in the first embodiment.

Referring to FIG. 2C, the first panel 202 and the display panel 212 are laminated with the optical adhesive 214, and at the same time, the optical adhesive 214 is extended toward an edge from an inner of the hollow region 208 of the film 210. At this point, since the second surface 200b has high surface tension, the optical adhesive 214 can thereby be closely adhered to the film 210. Lastly, a solidifying reaction is performed on the entire module of FIG. 2C, such as irradiating UV to solidify the optical adhesive 214.

FIG. 3 is a cross-sectional schematic diagram of the display apparatus of FIG. 2C in rework, wherein the same numeric labels as the second embodiment are used to represent the same components.

Referring to FIG. 3, when the display apparatus of FIG. 2C is going through quality check or fabrication, if any defective product is discovered, the protruding portion (refer to 206 of FIG. 2A-2) of the film 210 used as the dragging end can be pulled out and disassembled. Since the second surface 200b of the film 210 has high surface tension, the second surface 200b of the film 210 can be closely adhered to the optical adhesive 214. Therefore, when the film 210 is disassembled, the optical adhesive 214 can be removed at the same time without leaving adhesive residue.

Based on the above, the film of the display apparatus of the invention has a first surface having low surface tension and a second surface having high surface tension. The second surface can be closely adhered to the optical adhesive, and the first surface is laminated on the first surface though only electrostatic adhesion. Since the optical adhesive of the invention has strong cohesion, when disassembling, the first panel and the display panel can be separated by only tearing the first surface. The optical adhesive can be completely removed without the use of a special solvent for cleaning, which can save costs, simplify the fabricating process, and increase packaging speed and productivity.

Although the present invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A display apparatus, comprising:
   a first panel;
   a display panel disposed at one side of the first panel;
   a film disposed between the first panel and the display panel, wherein a surface of the film contacted to the first panel is a first surface, a surface of the film contacted to the display panel is a second surface, and a hollow region is within the film through the first surface and the second surface, wherein the first surface is laminated to the first panel through electrostatic adsorption; and
   an optical adhesive disposed in the hollow region of the film and between the first panel and the display panel, the optical adhesive is formed as a single composition extending between the first surface and the second surface, and the optical adhesive extends between the second surface of the film and the display panel and directly contacts with the second surface of the film,
   wherein the single composition for forming the optical adhesive comprises 97 wt % or more of an aliphatic polyurethane-based polymer, and a main chain of the aliphatic polyurethane-based polymer comprises: 50 wt % to 97 wt % of a urethane polymer; 2 wt % to 30 wt % of a lauric acid-based polyester; and 1 wt % to 20 wt % of an ethoxy-based polyester.

2. The display apparatus of claim 1, wherein the first panel is a touch panel or a glass panel.

3. The display apparatus of claim 1, wherein the hollow region is formed by cutting the film along an inner edge of a print region surrounding the first panel.

4. The display apparatus of claim 1, wherein a portion of the second surface is closely adhered to the display panel.

5. The display apparatus of claim 1, wherein the film has at least one protruding portion protruding from an edge of the first panel.

* * * * *